(12) United States Patent  
Hong et al.

(10) Patent No.: US 7,889,207 B2
(45) Date of Patent: Feb. 15, 2011

(54) IMAGE APPARATUS WITH IMAGE NOISE COMPENSATION

(75) Inventors: Li Hong, San Diego, CA (US); Maki Suzuki, Tokyo (JP); Mark Takita, Palo Alto, CA (US); W. Thomas Novak, Hillsborough, CA (US)

(73) Assignee: Nikon Corporation, Tokyo (JP)

( * ) Notice: Subject to any disclaimer, the term of this patent is extended or adjusted under 35 U.S.C. 154(b) by 982 days.

(21) Appl. No.: 11/704,404

(22) Filed: Feb. 8, 2007

(65) Prior Publication Data

US 2008/0192064 A1 Aug. 14, 2008

(51) Int. Cl.
  *G06T 17/00* (2006.01)
  *G09G 5/00* (2006.01)
  *H04N 5/235* (2006.01)
  *H04N 7/12* (2006.01)
  *G06K 9/40* (2006.01)
  *G03B 7/00* (2006.01)

(52) U.S. Cl. .................. 345/582; 345/428; 345/581; 348/221.1; 348/229; 348/362; 348/430; 382/254; 382/260; 382/264; 382/274

(58) Field of Classification Search .............. 348/169, 348/174, 208.13, 208.14, 221.1, 229, 362, 348/430–431, 526, 317; 345/581–582, 426, 345/428; 382/254, 255, 260–264, 274, 276, 382/282
See application file for complete search history.

(56) References Cited

U.S. PATENT DOCUMENTS

| 3,611,894 | A | * | 10/1971 | Minneste, Jr. | ............... 396/259 |
| 5,130,798 | A | * | 7/1992 | Christopher | ................. 348/620 |
| 5,294,979 | A | * | 3/1994 | Patel et al. | .................. 348/624 |
| 6,075,887 | A | * | 6/2000 | Brett | .......................... 382/167 |
| 7,391,907 | B1 | * | 6/2008 | Venetianer et al. | .......... 382/224 |
| 2004/0013292 | A1 | * | 1/2004 | Raunig | ........................ 382/128 |
| 2005/0057687 | A1 | * | 3/2005 | Irani et al. | ................... 348/443 |
| 2006/0158531 | A1 | * | 7/2006 | Yanof | ....................... 348/226.1 |
| 2007/0285698 | A1 | * | 12/2007 | Wang et al. | ................. 358/1.13 |
| 2008/0165258 | A1 | * | 7/2008 | Wajs | ....................... 348/222.1 |
| 2009/0051694 | A1 | * | 2/2009 | Pan et al. | ..................... 345/547 |
| 2009/0219379 | A1 | * | 9/2009 | Rossato et al. | ........... 348/14.01 |

* cited by examiner

*Primary Examiner*—Sajous Wesner
(74) *Attorney, Agent, or Firm*—Roeder & Broder LLP

(57) ABSTRACT

An image apparatus (10) for providing an adjusted image (242) of a scene (236) includes a capturing system (16) and a control system (24). The capturing system (16) captures an underexposed first frame (240) that is defined by a plurality of pixels (240A), including a first pixel and a second pixel. The first frame (240) includes at least one of a first texture region (240S) and a second texture region (240T). The control system (24) can analyze information from the pixels (240A) and determine if the first pixel has captured a portion of the first texture region (240S) or the second texture region (240T). Further, the control system (16) can analyze information from the pixels (240A) and to determine if the second pixel has captured a portion of the first texture region (240S) or the second texture region (240T). With this design, the control system (16) can reduce the noise in the first frame (240) to provide a well exposed adjusted image (242).

42 Claims, 11 Drawing Sheets

IMAGE APPARATUS WITH IMAGE NOISE COMPENSATION

BACKGROUND

Cameras are commonly used to capture an image of a scene. Current consumer digital still cameras typically utilize a low sensitivity CCD image sensor that requires a relatively long exposure time in low light scenarios. Unfortunately, during the relatively long exposure time, motion of the camera or movement of the objects in the scene will cause the resulting captured image to be blurred. The amount of blurring will depend upon the rate of camera motion, the rate of object movement, the length of exposure time, and the zoom factor.

SUMMARY

The present invention is directed to a system for providing an adjusted image of a scene. The system includes a capturing system and a control system. In certain embodiments, the system is particularly useful for providing a perceptually pleasant, normally exposed adjusted image in a low light environment. In one embodiment, the capturing system captures a low resolution frame ("LRN frame") that is properly exposed and a high resolution frame ("HRU frame") that is under exposed. For example, the LRN frame has a longer exposure time than the HRU frame, and the LRN frame can be a through frame. In certain embodiments, the control system adjusts the tone and/or reduces noise in the HRU frame in order to provide a perceptually pleasant, normally exposed adjusted image.

For example, the control system can use color information from the LRN frame to adjust the tone of the HRU frame for the adjusted image. Alternatively, the exposure information from the LRN frame can be directly used by the control system to adjust the analog gain factor of the HRU frame for the adjusted image. With this design, the adjusted image will appear to be normally exposed.

Moreover, the control system can reduce the noise in the HRU frame to provide the adjusted image using information from the HRU frame. Alternately, the control system can reduce noise in the HRU frame to provide the adjusted image combining information from both the LRN frame and the HRU frame.

The HRU frame is defined by a plurality of pixels, including a first pixel and a second pixel. Further, the HRU frame includes at least one of a first texture region and a second texture region. In one embodiment, the control system analyzes information from the pixels and categorizes the first pixel as a portion of the first texture region or a portion of the second texture region. Further, the control system can analyze information from the pixels to categorize the second pixel as a portion of the first texture region or a portion of the second texture region. With this design, in certain embodiments, the control system can use noise reduction software to process information from the pixels to reduce noise in the HRU frame to provide a perceptually pleasant, adjusted image.

In one embodiment, the information from the pixels which are categorized as a portion of the first textured region is processed with a first filter. Further, the information from the pixels which are categorized as a portion of the second textured region is processed with a second filter that is different than the first filter. For example, information from the first pixel can be processed with the first filter and information from the second pixel can be processed with the second filter. With this design, the control system processes the information from the first pixel differently than the information from the second pixel, and the control system can provide a high resolution and high sensitivity adjusted image with relatively low noise levels.

In another embodiment, the high resolution frame can also include a third texture region, and the control system can analyze information from the pixels and categorize the first pixel as a portion of the first texture region, a portion of the second texture region, or a portion of the third texture region. In this embodiment, if the first pixel is categorized as a portion of the first textured region, the information from the first pixel is processed with the first filter; if the first pixel is categorized as a portion of the second textured region, the information from the first pixel is processed with the second filter; or if the first pixel is categorized as a portion of the third textured region, the information from the first pixel is processed with a third filter that is different from the first filter and the second filter. In one non-exclusive embodiment, the first filter is a large size low pass filter, the second filter is a moderate size low pass filter, and the third filter is a direction oriented low pass filter.

The control system can analyze the intensity of the first pixel and the intensity of the pixels that are nearby the first pixel to categorize the first pixel as a portion of the first texture region, a portion of the second texture region, or a portion of the third texture region.

Additionally, the HRU frame can be separated into a base layer and a details layer, and the pixels of the details layer are evaluated and are subjected to noise reduction. Alternatively, a luminance channel of the HRU frame can be subjected to noise reduction. Still alternatively, the luminance channel of the HRU frame can be separated into a base layer and a details layer. In this embodiment, the details layer of the luminance channel can be subjected to noise reduction.

In one embodiment, the control system separates the HRU frame into a first base layer and a first details layer and the LRN frame into a second base layer and a second details layer. Further, in this version, the control system can blend the first details layer with the second base layer to provide the adjusted image.

In yet another embodiment, the present invention can be directed to an image apparatus that includes a capturing system and a control system. The capturing system captures a HRU frame that is defined by a plurality of pixels, including a first pixel and a second pixel. In this embodiment, the control system can process information from the first pixel with a first filter and process information from the second pixel with a second filter that is different than the first filter to provide the adjusted image.

In still another embodiment, the capturing system captures an HRU frame and the control system processes the first frame to provide a normally exposed adjusted image.

The present invention is also directed to a method for providing a well exposed adjusted image from a HRU frame. Further, the present invention is directed to a method for reducing noise in a HRU frame.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
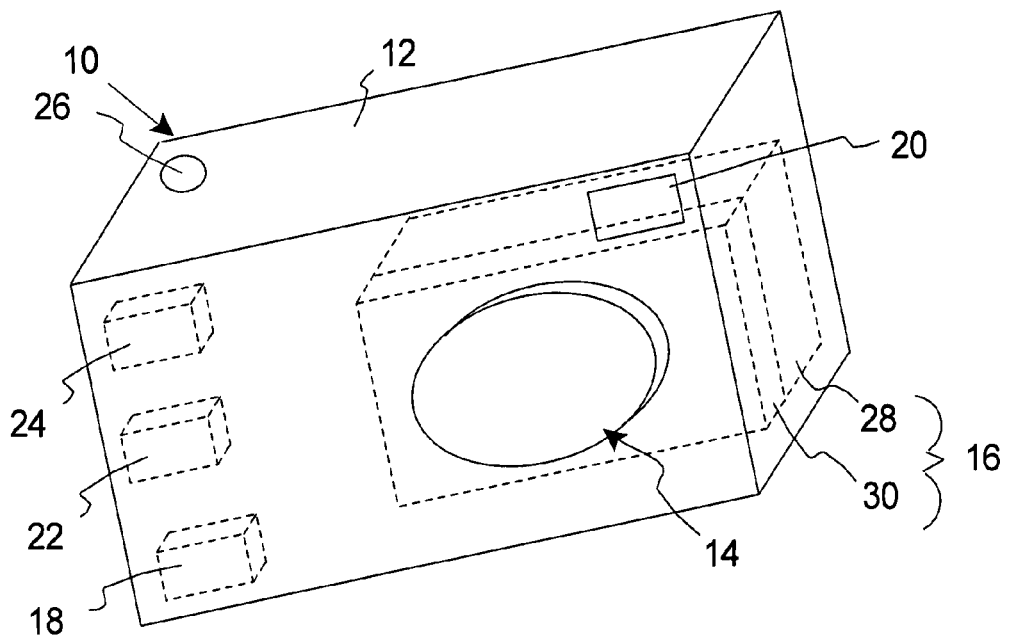
FIG. 1A is a simplified front perspective view and FIG. 1B is a simplified rear perspective view of the image apparatus.
Figure 1B:
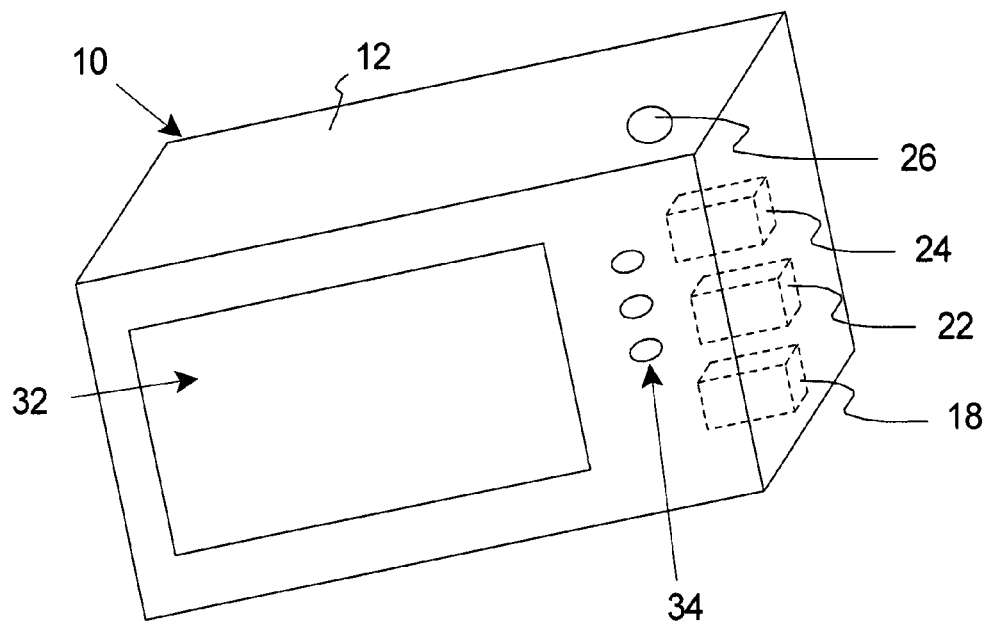

FIGS. 1A and 1B are simplified perspective views of one non-exclusive embodiment of an image apparatus 10 that is useful for providing an adjusted image (not shown in FIGS. 1A and 1B) of a scene (not shown in FIGS. 1A and 1B). In this embodiment, the image apparatus 10 is a digital camera that includes an apparatus frame 12, an optical assembly 14, a capturing system 16 (illustrated as a box in phantom), a power source 18 (illustrated as a box in phantom), an illumination system 20, a storage assembly 22 (illustrated as a box in phantom), and a control system 24 (illustrated as a box in phantom). The design of these components can be varied to suit the design requirements and type of image apparatus 10. Further, the image apparatus 10 could be designed without one or more of these components. For example, the image apparatus 10 could be designed without the illumination system 20.

As an overview, in certain embodiments, the image apparatus 10 provided herein can provide a high resolution and high sensitivity adjusted image with low noise levels even in low light scenarios. The present invention provides a number of ways to provide a pleasing high resolution and high sensitivity adjusted image for low light scenarios. In one embodiment, the image apparatus 10 captures an underexposed, high resolution first frame (not shown in FIGS. 1A and 1B) and the control system 24 reduces the noise in at least a portion of the first frame to provide the adjusted image.

The apparatus frame 12 can be rigid and support at least some of the other components of the image apparatus 10. In one embodiment, the apparatus frame 12 defines a cavity that receives and retains at least a portion of the capturing system 16, the power source 18, the illumination system 20, the storage assembly 22, and the control system 24. Further, the optical assembly 14 is fixedly secured to the apparatus frame 12.

The image apparatus 10 can include an aperture (not shown) and a shutter mechanism (not shown) that work together to control the amount of light that reaches the capturing system 16. The shutter mechanism can include a pair of blinds that work in conjunction with each other to allow the light to be focused on the capturing system 16 for a certain amount of time. Alternatively, for example, the shutter mechanism can be all electronic and contain no moving parts. For example, an electronic capturing system can have a capture time controlled electronically to emulate the functionality of the blinds. The time in which the shutter mechanism allows light to be focused on the capturing system 16 is commonly referred to as the capture time or the exposure time. The length of the exposure time can vary. The shutter mechanism is activated by a shutter button 26.

The optical assembly 14 can include a single lens or a combination of lenses that work in conjunction with each other to focus light onto the capturing system 16.

In one embodiment, the imaging apparatus 10 includes an autofocus assembly (not shown) including one or more lens movers that move one or more lenses of the optical assembly 14 in or out to focus the light on the capturing system 16.

The capturing system 16 captures the first image during the exposure time. The design of the capturing system 16 can vary according to the type of image apparatus 10. For a digital type camera, the capturing system 16 includes an image sensor 28 (illustrated in phantom), and a filter assembly 30 (illustrated in phantom) e.g. a Bayer filter.

The image sensor 28 receives the light that passes through the aperture and converts the light into electricity. One non-exclusive example of an image sensor 28 for digital cameras is known as a charge coupled device ("CCD"). An alternative image sensor 28 that may be employed in digital cameras uses complementary metal oxide semiconductor ("CMOS") technology. Each of these image sensors 28 includes a plurality of pixels.

The power source 18 provides electrical power to the electrical components of the image apparatus 10. For example, the power source 18 can include one or more batteries.

The illumination system 20 can provide a flash of light that can be used to illuminate at least a portion of the scene.

The storage assembly 22 stores the various captured frames and/or the adjusted images. The storage assembly 22 can be fixedly or removable coupled to the apparatus frame 12. Non-exclusive examples of suitable storage assemblies 22 include flash memory, a floppy disk, a hard disk, or a writeable CD or DVD.

The control system 24 is electrically connected to and controls the operation of the electrical components of the image apparatus 10. The control system 24 can include one or more processors and circuits and the control system 24 can be programmed to perform one or more of the functions described herein.

In certain embodiments, the control system 24 provides an adjusted image using a digital noise reduction algorithm to achieve high resolution and high sensitivity for low light scenarios exposures. In some embodiments, the control system 24 can use information from a single frame to produce the adjusted image. Alternatively, in other embodiments, the control system 24 utilizes multiple frames to produce the adjusted image. In certain embodiments, the noise reduction methods disclosed herein are based on the perceptual observation that human vision varies in sensitivity to noise present in different areas of the image, i.e., noise is more noticeable in low frequency areas than that in high frequency areas. The image noise reduction methods are described in more detail below.

Additionally, the image apparatus 10 can include an image display 32 that displays the adjusted image. Additionally, the image display 256 can display other information such as the time of day, and the date. Moreover, the image apparatus 10 can include one or more control switches 34 electrically connected to the control system 24 that allows the user to control the functions of the image apparatus 10.

In certain embodiments, the tone adjustment and noise compensation described herein is particularly suitable for low light environments. In normal light conditions, the high resolution frame is not underexposed. Accordingly, there may not be a need to provide tone adjustment and/or image noise compensation to the high resolution frame in normal light conditions. For example, one or more of the control switches 34 can be used to selectively activate the tone adjustment and/or image noise compensation described herein. Alternatively, the control system 24 can evaluate the lighting conditions and the control system 24 can determine when to activate the tone adjustment and/or image noise compensation described herein.

Figure 2A:
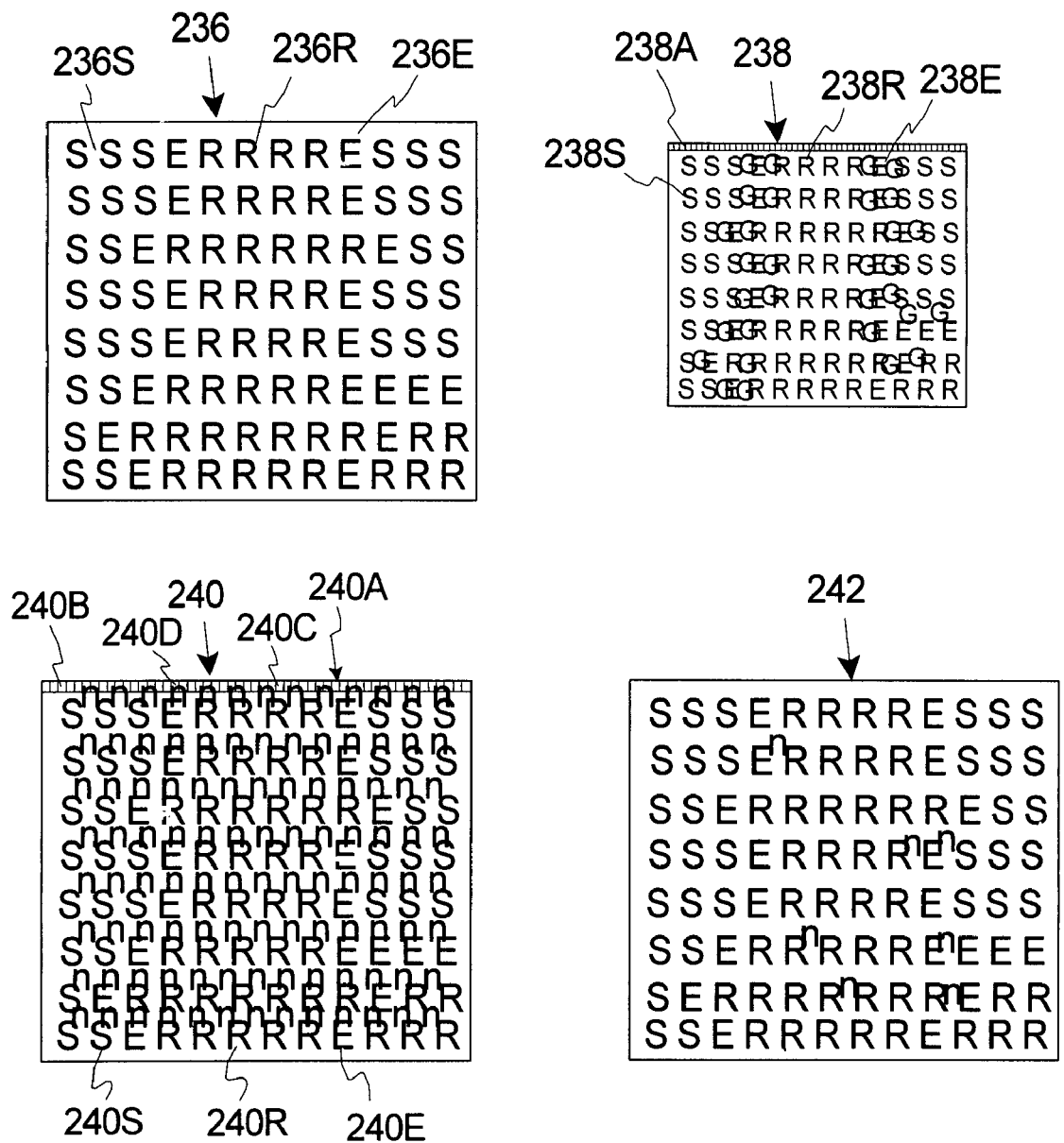
FIG. 2A is an illustration of a scene, a couple of frames captured by the image apparatus of FIG. 1A, and an adjusted image.

FIG. 2A is an illustration of a scene 236, a low resolution, properly exposed frame 238 (sometimes referred to a "LRN frame") of the scene 236 captured by the image apparatus 10 (illustrated in FIGS. 1A and 1B), a high resolution, underexposed frame 240 (sometimes referred to a "HRU frame") of the scene 236 captured by the image apparatus 10, and an adjusted image 242 provided by the image apparatus 10. As provided herein, one or more of the frames 238, 240 can be used to generate a high resolution, low noise adjusted image 242. It should be noted that either the LRN frame 238 or the HRU frame 240 can also be referred to as the first or the second frame. Further, multiple LRN frames 238 can be used to generate the adjusted image 242.

The type of scene 236 captured by the image apparatus 10 can vary. For example, the scene 236 can include features such as one or more animals, plants, mammals, fish, objects, and/or environments. In one embodiment, the scene 236 can be characterized based on the texture of the objects in the scene 236. For example, in one embodiment, the scene 236 can include (i) one or more scene smooth regions 236S (represented as "S"), (ii) one or more scene rough regions 236R (represented as "R"), and/or (ii) one or more scene edge regions 236E (represented as "E"). In this embodiment, the texture of the scene 236 is described in terms of three different textures. Alternatively, the texture of the scene 236 can be described as having more than three or less than three different textures.

As used herein, (i) the term scene smooth region 236S shall mean areas of the scene 236 which have a substantially constant color (color homogenous regions), (ii) the term scene rough region 236R shall mean areas of the scene 236 which have some detail and change in color, and (iii) the term scene edge region 236E shall mean areas of the scene 236 which are in the transition between objects, and sharp color changes. Non-exclusive examples of scene smooth regions 236S include a wall that is a constant color, a piece of furniture e.g. a table that is a constant color, or a clear sky during the day. Non-exclusive examples of scene rough regions 236R include a cloudy sky, grass, or multicolored carpet. Non-exclusive examples of scene edge regions 236E include areas of transition between objects in the scene, such as an edge of a table or areas of transitions in color.

In FIG. 2A, the simplified scene 236 is illustrated as having two spaced apart scene smooth regions 236S, two spaced apart scene rough regions 236R, and two scene edge regions 236E that separate the scene smooth regions 236S from the scene rough regions 236R. Alternatively, the scene 236 can include any combination of one or more of these regions.

In one embodiment, the LRN frame 238 and the HRU frame 240 are captured in rapid succession. In alternative, non-exclusive embodiments, the LRN frame 238 and the HRU frame 240 are captured within approximately 0.01, 0.05, 0.2, or 0.5 of a second to each other. Because, the LRN frame 238 and the HRU frame 240 are captured in rapid succession, there is less chance for movement of the objects in the scene 236.

In one embodiment, the LRN frame 238 has a lower resolution than the HRU frame 240 and is smaller in size. For example, the LRN frame 238 can have a relatively low resolution. In one embodiment, the LRN frame 238 is comprised of a relatively low number of LRN pixels 238A (only a few representative pixels are illustrated in FIG. 2A), e.g. approximately 1, 1.5, or 2 million LRN pixels 238A. One or more of the LRN pixels 238A can be referred to generally as a first pixel, a second pixel, or a third pixel. The LRN frame 238 can be a standard through frame of the image apparatus 10 that is captured prior to the capture of the HRU frame 240. In certain embodiments, the LRN frame 238 is used to capture the colors of the scene 236 and/or to reduce noise in the HRU frame 240.

In contrast, the HRU frame 240 can have a relatively high resolution to capture the details in the scene 236. In one embodiment the HRU frame 240 is comprised of a relatively larger number of HRU pixels 240A (only a few representative pixels are illustrated in FIG. 2A), e.g. at least approximately 3, 4, 5, 6, 7, 8, 9, 10, or 12 million pixels. One or more of the HRU pixels 240A can be referred to generally as a first pixel, a second pixel, or a third pixel.

Alternatively, the LRN frame 238 and/or the HRU frame 240 can have resolutions that are different than the examples described above.

Further, in one embodiment, the LRN frame 238 can be properly exposed and the HRU frame 240 can be underexposed for the existing lighting conditions of the scene 236. Stated in another fashion, the HRU frame 240 can have a HRU exposure time that is relatively short for the existing lighting conditions of the scene 236. This reduces the likelihood of motion blur in the HRU frame 240 in low light scenarios. More specifically, as a result of the short HRU exposure time for the low light condition, there is less time for movement of the image apparatus 10 by the user, or movement of the one or more objects in the scene 236 that can cause blur.

In non-exclusive, alternative examples, the HRU frame 240 can be less than approximately 40, 50, 60, 70, 80, or 90 percent exposed and the HRU exposure time is less than approximately 40, 50, 60, 70, 80, or 90 percent of the LRN exposure time for the LRN frame 238. For example, depending upon the lighting conditions, the LRN exposure time can be approximately 1/10, 1/20 or 1/30 of a second, and the HRU exposure time can be approximately 1/40, 1/50, 1/60 or 1/80 of a second. However, other exposure times can be utilized.

The LRN frame 238 can be characterized as including one or more LRN image texture regions that include (i) one or more LRN smooth regions 238S (represented as "S"), (ii) one or more LRN rough regions 238R (represented as "R"), and (iii) one or more LRN edge regions 238E (represented as "E"), depending upon the composition of the scene 236 captured by the LRN frame 238. As illustrated in FIG. 2A, the LRN frame 238 includes two spaced apart LRN smooth regions 238S, two spaced apart LRN rough regions 238R, and two LRN edge regions 238E that separate the LRN smooth and LRN rough regions 238S, 238R. With this design, some of the LRN pixels 238A can be categorized as a portion of one of LRN smooth regions 238S, some of the LRN pixels 238A can be categorized as a portion of one of the LRN rough regions 238R, and some of the LRN pixels 238A can be categorized as a portion of one of the LRN edge regions 238E.

In this embodiment, the texture of the LRN frame 238 is described in terms of three different texture regions. Alternatively, the texture of the LRN frame 238 can be described as having more than three or less than three different texture regions. Further, the LRN smooth regions 238S, the LRN rough regions 238R, and/or the LRN edge regions 238E can also be referred to as a first texture region, a second texture region, and/or a third texture region.

Further, FIG. 2A illustrates that because of the low resolution of the LRN frame 238, the transition between the texture regions may not be that sharp. This is represented by "G" in FIG. 2A. Further, in certain situations, because of the relatively long LRN exposure time, the LRN frame 238 can be double exposed because of movement of the image apparatus and/or the objects in the scene 236. It the LRN frame 238 is double exposed, the information from the LRN frame 238 may only be useful for tone adjustment of the HRU frame 240.

Somewhat similarly, the HRU frame 240 can be characterized as including one or more HRU image texture regions that include (i) one or more HRU smooth regions 240S (represented as "S"), (ii) one or more HRU rough regions 240R (represented as "R"), and (iii) one or more HRU edge regions 240E (represented as "E") depending upon the composition of the scene 236 captured by the HRU frame 240. As illustrated in FIG. 2A, the HRU frame 240 includes two spaced apart HRU smooth regions 240S, two spaced apart HRU rough regions 240R, and two HRU edge regions 240E that separate the HRU smooth and HRU rough regions 240S, 240R. With this design, some of the HRU pixels 240A can be categorized as a portion of one of HRU smooth regions 240S, some of the HRU pixels 240A can be categorized as a portion of one of the HRU rough regions 240R, and some of the HRU pixels 240A can be categorized as a portion of one of the HRU edge regions 240E.

In this embodiment, the texture of the HRU frame 240 is described in terms of three different texture regions. Alternatively, the texture of the HRU frame 240 can be described as having more than three or less than three different texture regions. Further, the HRU smooth regions 240S, the HRU rough regions 240R, and/or the HRU edge regions 240E can also be referred to as a first texture region, a second texture region, and/or a third texture region.

Further, as illustrated in FIG. 2A, the HRU frame 240 contains significant image noise (represented as "n") because of the relatively short HRU exposure time for the existing lighting conditions.

FIG. 2A also illustrates that the adjusted image 242 provided by the image apparatus 10 closely resembles the scene 236. Stated in another fashion, the adjusted image 242 provided by the image apparatus 10 has a relatively high resolution and has relatively low noise (represented as "n"). As discussed above, the control system 24 provides a pleasing adjusted image 242 using a digital vibration reduction algorithm to achieve high resolution and high sensitivity for low light exposures.

Figure 2B:
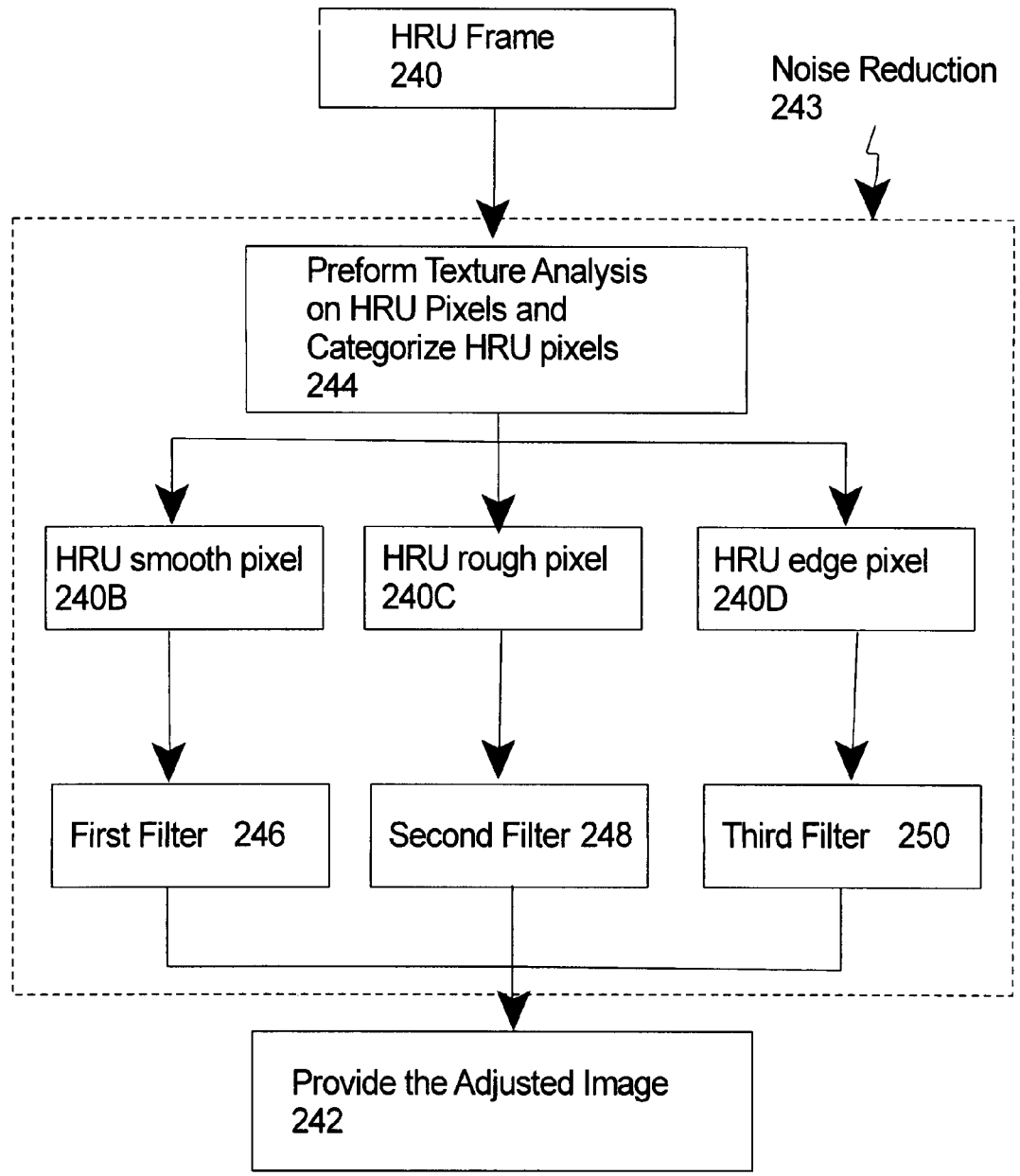
FIG. 2B is a flow chart that illustrates one version of a digital noise reduction approach.

FIG. 2B is a flow chart that illustrates one method that can be used to provide the adjusted image 242 from at least one of the frames 238, 240. In this embodiment, the control system uses just the HRU frame 240 in a first noise reduction method 243 to generate the adjusted image 242. In this embodiment, tone adjustment of the HRU frame 240 is not mentioned. However, as provided below, the HRU frame 240 can also be tone adjusted using information from the LRN frame 238.

First, in this embodiment, the control system 24 performs a texture analysis 244 on the information from the HRU pixels 240A to categorize the HRU pixels 240A. More specifically, with information from the HRU pixels 240A, the control system 24 uses one or more algorithms to categorize each of the HRU pixels 240A as a part of the HRU smooth regions 240S, a part of the HRU rough regions 240R, or a part of the HRU edge regions 240E. The HRU pixels 240A that are categorized as part of the HRU smooth regions 240S can be classified as HRU smooth pixels 240B, the HRU pixels 240A that are categorized as part of the HRU rough regions 240R can be classified as HRU rough pixels 240C, and the HRU pixels 240A that are categorized as part of the HRU edge regions 240E can be classified as HRU edge pixels 240D. In this embodiment, texture analysis classified the HRU pixels 240A as one of three types. Alternatively, the control system 24 can classify the HRU pixels 240A with more than three or less than three texture types It should also be noted that the HRU smooth pixels 240B, the HRU rough pixels 240C, and the HRU edge pixels 240D can also be referred to as a first texture pixel, a second texture pixel, and a third texture pixel.

One way of evaluating the HRU pixels 240A includes comparing pixel information from neighboring pixels HRU pixels 240A and looking for how much change has occurred in these HRU pixels 240A. In one embodiment, the term neighboring pixels shall mean adjacent or nearby pixels. If these neighboring HRU pixels 240A have similar pixel information, these pixels can be classified as HRU smooth pixels 240B.

In one embodiment, the pixel information utilized is the intensity. For example, to determine if a first HRU pixel 240A should be classified as a smooth, rough or edge HRU pixel, the intensity of the first HRU pixel 240A and its neighbors 240A is evaluated. If the variation in intensity of the first HRU pixel 240A and its neighboring pixels 240A is relatively small (e.g. the pixels have similar intensities), the first HRU pixel 240A can be classified as a smooth HRU pixel 240B. Alternatively, if the variation in intensity of the first HRU pixel 240A and its neighboring pixels 240A is relatively high, a simple edge detection scheme can be performed to classify the first HRU pixel 240A as either a rough HRU pixel 240C or an edge HRU pixel 240D. A simple edge detection scheme can be a convolution with an edge detection filter (e.g. a soble). The edge pixel will lead to large convolution results in a clear oriented direction, where the rough pixel will not.

Further, if the variation in intensity of the first HRU pixel 240A and its neighboring pixels 240A is relatively high in one direction (e.g. horizontally, vertically, or diagonally), the first HRU pixel 240A can be classified as an edge HRU pixel 240D. Moreover, if the variation in intensity of the first HRU pixel 240A and its neighboring pixels 240A is relatively high in random (non-oriented) directions, the first HRU pixel 240A can be classified as a rough HRU pixel 240C.

These processes can be repeated for the other HRU pixels 240A until all of the HRU pixels 240A are classified.

One way to evaluate the variation in intensity is to perform a standard deviation on the first HRU pixel 240A and its neighboring pixels 240A. For example, (i) if the standard deviation is relatively low, the first HRU pixel 240A can be classified as a HRU smooth pixel 240B, and (ii) if the standard deviation is relatively high, the first HRU pixel 240A is classified as a HRU rough pixel 240C, or as a HRU edge pixel 240D. Subsequently, if the standard deviation is relatively high, the edge detection scheme is performed to classify the first HRU pixel 240A as either a rough HRU pixel 240C or an edge HRU pixel 240D.

In alternative, non-exclusive embodiments, (i) if the standard deviation is less than approximately 2, 4, 6, 8, or 10, the first HRU pixel 240A can be classified as a HRU smooth pixel 240B, and (ii) if the standard deviation is greater than approximately 2, 4, 6, 8, or 10, the first HRU pixel 240A can be classified as a HRU rough pixel 240C or as a HRU edge pixel 240D.

It should be noted that in other embodiments, the pixel information used can additionally or alternatively include one or more of the red channel, the blue channel, the green channel, the chrominance channels, and the luminance channel information for the HRU pixels 240A.

In one embodiment, depending upon the classification of the HRU pixel 240A, different filters can be applied to the information from these HRU pixels 240A to remove noise. For example, in one embodiment, (i) a first filter 246 is applied to the HRU smooth pixels 240B, (ii) a second filter 248 is applied to the HRU rough pixels 240C, and (iii) a third filter 250 is applied to the HRU edge pixels 240D. In one embodiment, (i) the first filter 246 can be a large size low pass filter that aggressively removes the noise from the HRU smooth pixels 240B, (ii) the second filter 248 can be a moderate sized low pass filter that lowers the noise level in HRU rough pixels 240C, and (iii) the third filter 250 can be a direction-oriented low pass filter that removes noise in the HRU edge pixels 240D while preserving the edge contours for the adjusted image 242.

In one embodiment, (i) a suitable large size low pass filter has 8-30 pixels, (ii) a suitable moderate sized low pass filter has 2-8 pixels, and (iii) a suitable direction-oriented low pass filter is a bilateral filter that is composed of two Gaussian filters, one in the spatial domain and one in the intensity domain. However, the filters can have other values than described above.

In another embodiment, (i) the first filter 246 is a relatively large sized Gaussian low pass filter that is applied to HRU smooth pixels 240B, (ii) the third filter 250 is a moderately sized bilateral filter that is applied to HRU edge pixels 240D, and (iii) the HRU rough pixels 240C are left unprocessed.

Subsequently, the filtered HRU pixels 240A are blended and merged together to generate the adjusted image 242.

In certain embodiments, no matter how good the texture analysis, it is inevitable that the control system may not be able to categorize the texture of certain pixels. In one embodiment, weight can be assigned according to its uncertainty and various noise reducing filters can be blended together based on the associated weight.

Referring back to FIG. 2A, comparing the HRU image 240 to the adjusted image 242 illustrates that the noise level has been reduced by the control system in the smooth regions, the rough regions, and the edge regions of the adjusted image 242. Further, the resulting adjusted image 242 also preserves sharp edge contours in a reasonable sense. In certain embodiments, the degree in which the noise is reduced will depend upon how accurately the texture analysis is performed and how the noise is handled.

Figure 2C:
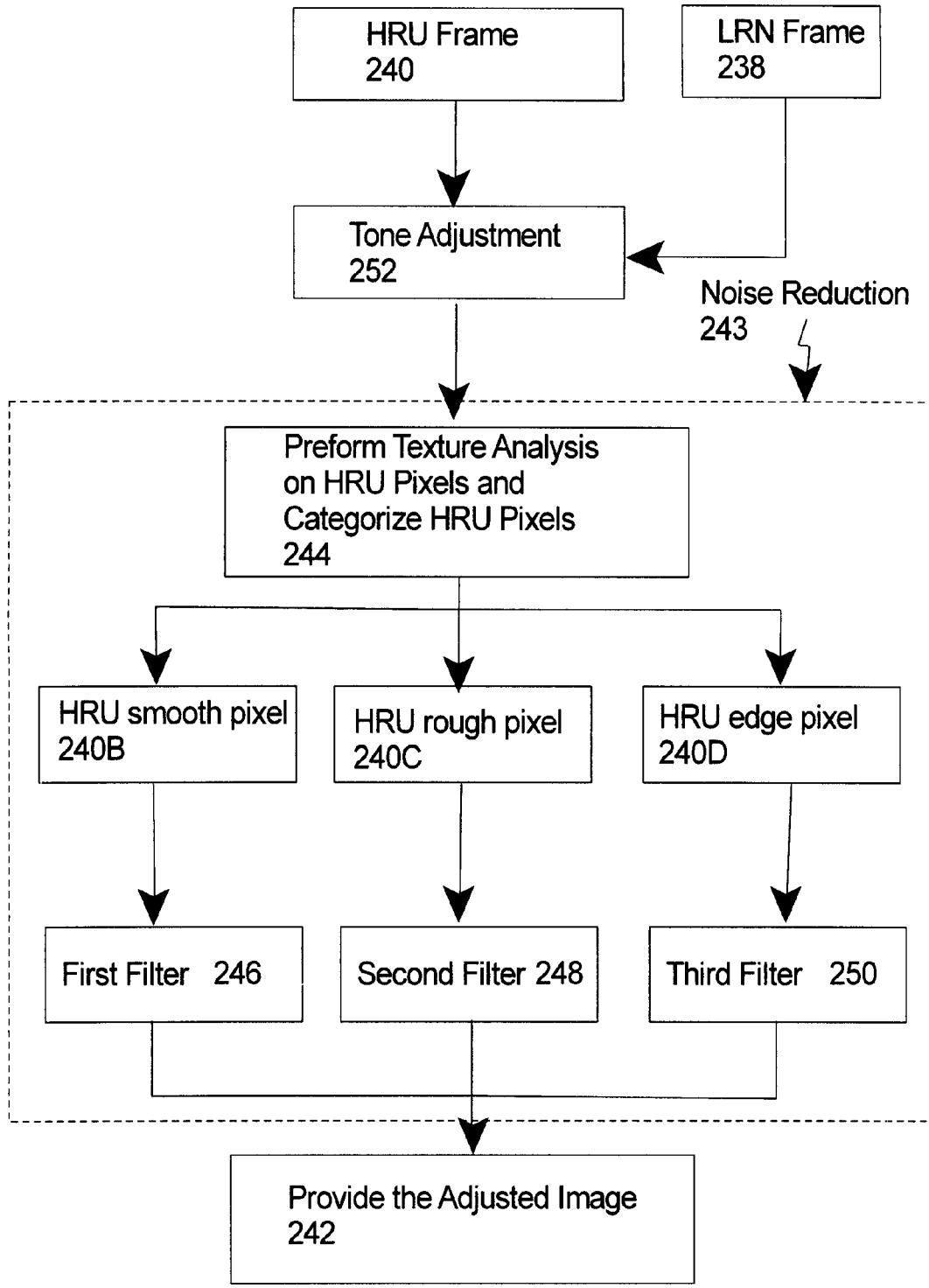
FIG. 2C is a flow chart that illustrates another version of a digital noise reduction approach.

FIG. 2C is a flow chart that illustrates another method to provide the adjusted image 242 from the HRU frame 240 that is similar to the method described above and illustrated in FIG. 2B. However, in this embodiment, the control system 24 performs a tone adjustment 252 on the HRU frame 240 prior to reducing the noise reduction 243. A number of non-exclusive methods can be used to perform tone adjustment 252. For example, the control system 24 can use information from the LRN frame 238 to adjust the color tone.

In one embodiment, the control system 24 applies a histogram equalization method to adjust the tone of the HRU frame 240 to match that of the LRN frame 238. In this version, is it assumed that the frames 238, 240 from the scene 236 should have similar color statistics (e.g., contrast, brightness, etc) independent of the resolution of the frames 238, 240. Because the histogram is a good measurement for the scene contrast and brightness, a normal-exposed frame should have similar histogram as that of the LRN frame 238. Accordingly, the tone of the HRU image 240 can be adjusted to correspond to the tone of the LRN frame 238.

Alternatively, other types of tone-adjustment methods such as linear contrast stretching (LCS) or contrast limited histogram equalization (CHEQ) can be utilized. The LCS method adjusts the histogram of the HRU frame 240 by linearly mapping (or stretching) it to match that of the LRU frame 238. The CHEQ method adjusts the histogram of each local region of the HRU image to a desired distribution targeting to preserve the local contrast.

Still alternatively, the exposure information from the LRN frame 238 can be directly used by the control system to adjust the analog gain factor of the HRU frame 240.

It should be noted that the tone adjustment provided herein can be used in conjunction with any of the noise reduction method described herein.

Figure 3:
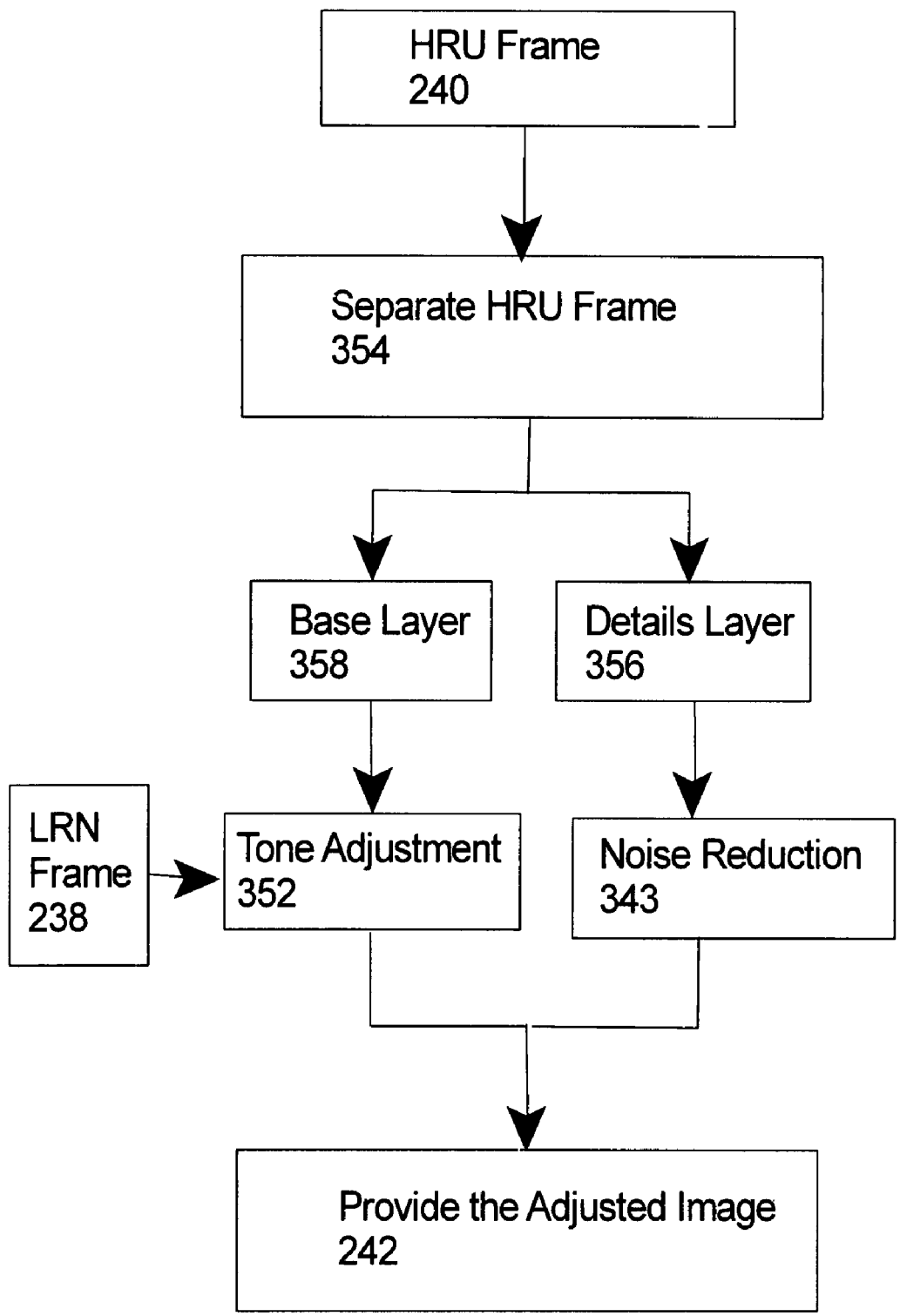
FIG. 3 is a flow chart that illustrates still another version of a digital noise reduction approach.

FIG. 3 is a flow chart that illustrates another method of noise reduction that is somewhat similar to the versions described above. However, in this embodiment, the HRU frame 240 is first separated 354 in a details layer 356 and a base layer 358. The details layer 356 can be the high frequency components (e.g. the features) of the HRU frame 240, and typically includes high noise. In contrast, the base layer 358 can be the low frequency components of the HRU frame 240, including low noise.

One non-exclusive method used to separate the details layer 356 and the base layer 358 from the HRU frame 240 is disclosed herein. More specifically, the base layer 358 is derived by applying a low pass filter to the HRU frame 240. Stated in another fashion, a low pass filter with edge preservation (e.g. bilateral filter) is applied to the intensity information of the HRU pixels 240A of the HRU frame 240 to generate the base layer 358. With this information, the details layer 356 can be derived by dividing the HRU frame 240 by the base layer 358. Stated in another fashion, the intensity information of the HRU pixels 240A of the HRU frame 240 is divided by the intensity information of the base layer 358 to generate the details layer 356.

In the embodiment illustrated in FIG. 3, the base layer 358 is tone adjusted 352 using the LRN frame 238 in a fashion similar to that described above. Further, the noise reduction 343 is performed on the details layer 356 in a fashion similar to that described above. Subsequently, the tone adjusted base layer 358 and the noise reduced details layer 356 are blended and merged to generate the adjusted image 242. In certain embodiments, this method avoids the unpredictable amplified noise results that can be caused by the tone-mapping operation of the entire HRU frame 240.

Figure 4:
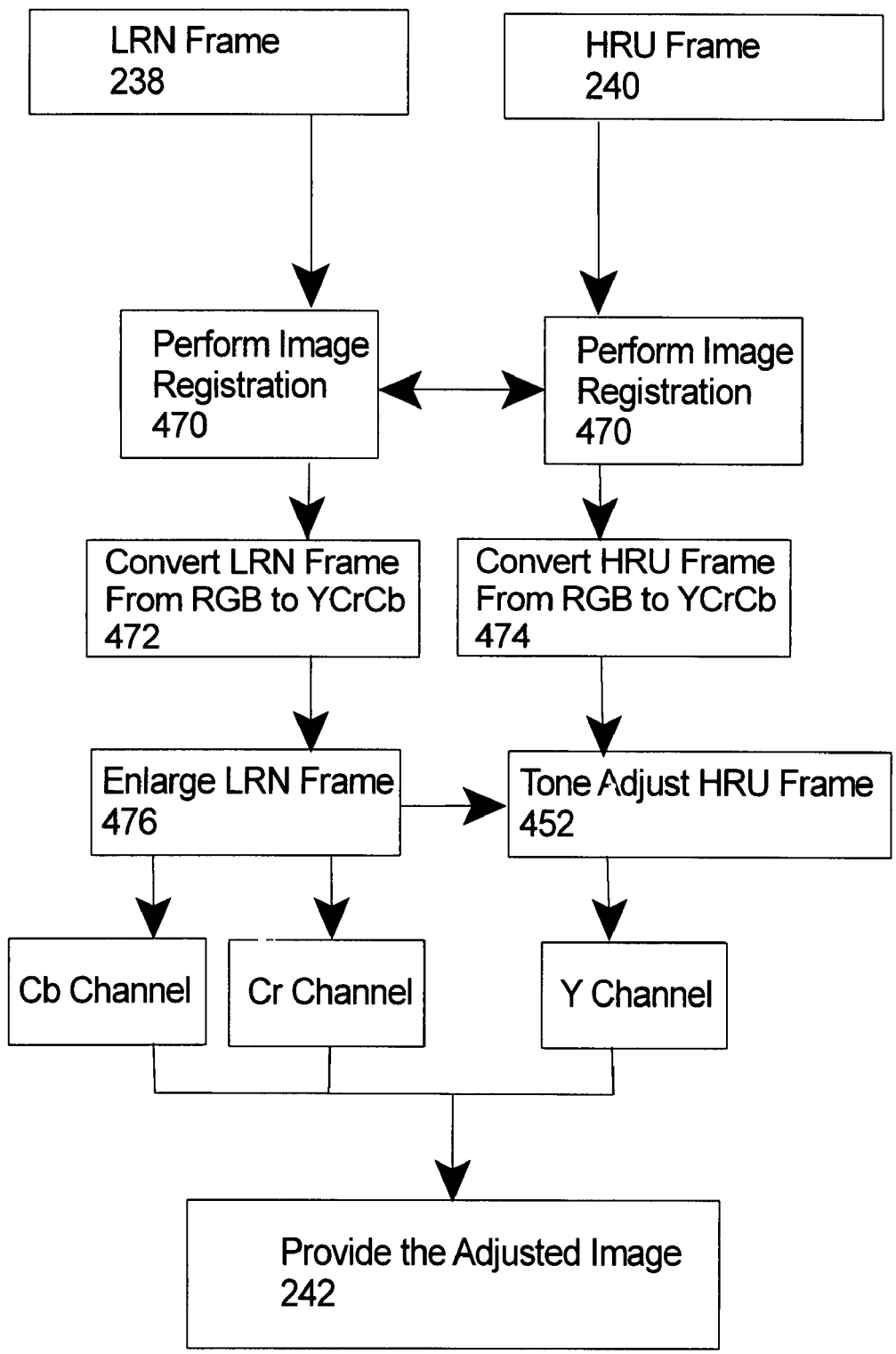
FIG. 4 is a flow chart that illustrates yet another version of a digital noise reduction approach.

Alternatively, in other embodiments, the control system 24 can utilize multiple captured frames to synthesize the high resolution, well-exposed adjusted image 242. FIG. 4 is a flow chart that illustrates another method to provide the adjusted image 242. In this embodiment, the first step is to perform image registration 470 to align the LRN frame 238 with the HRU frame 240. Image registration methods are already well known in the art. One method of image registration is a global hierarchical approach. Due to the short exposure time needed by the HRU frame 240, the displacement of the objects between LRN frame 238 and HRU frame 240 should be small enough to allow a good image registration. However, for special situations with a fast moving object inside the scene, the alignment may require special handling.

In FIG. 4, after alignment, the LRN frame 238 is converted from a RGB color space to the YCbCr color space 472 and the HRU frame 240 is converted from a RGB color scheme to YCbCr color scheme 474. A Next, the LRN frame 238 is enlarged 476 to match the size of the HRU frame 240. Further, the HRU frame 240 is tone adjusted 452 using the LRN frame 238. Subsequently, the enlarged chrominance channels 'Cb', 'Cr' of LRN frame 238 are merged with the luminance 'Y' channel of the tone-adjusted HRU frame 240 to provide the adjusted image 242. With this design, the chrominance channels of the tone-adjusted HRU frame 240 is replaced with the chrominance channels of the enlarged LRN frame 238. In certain embodiments, the principle behind this is that human vision is less sensitive to chrominance difference than luminance difference. It should be noted that one or more of the steps illustrated in FIG. 4 can be optional. For example, tone-adjustment step of the HRU frame 240 can be optional.

Figure 5A:
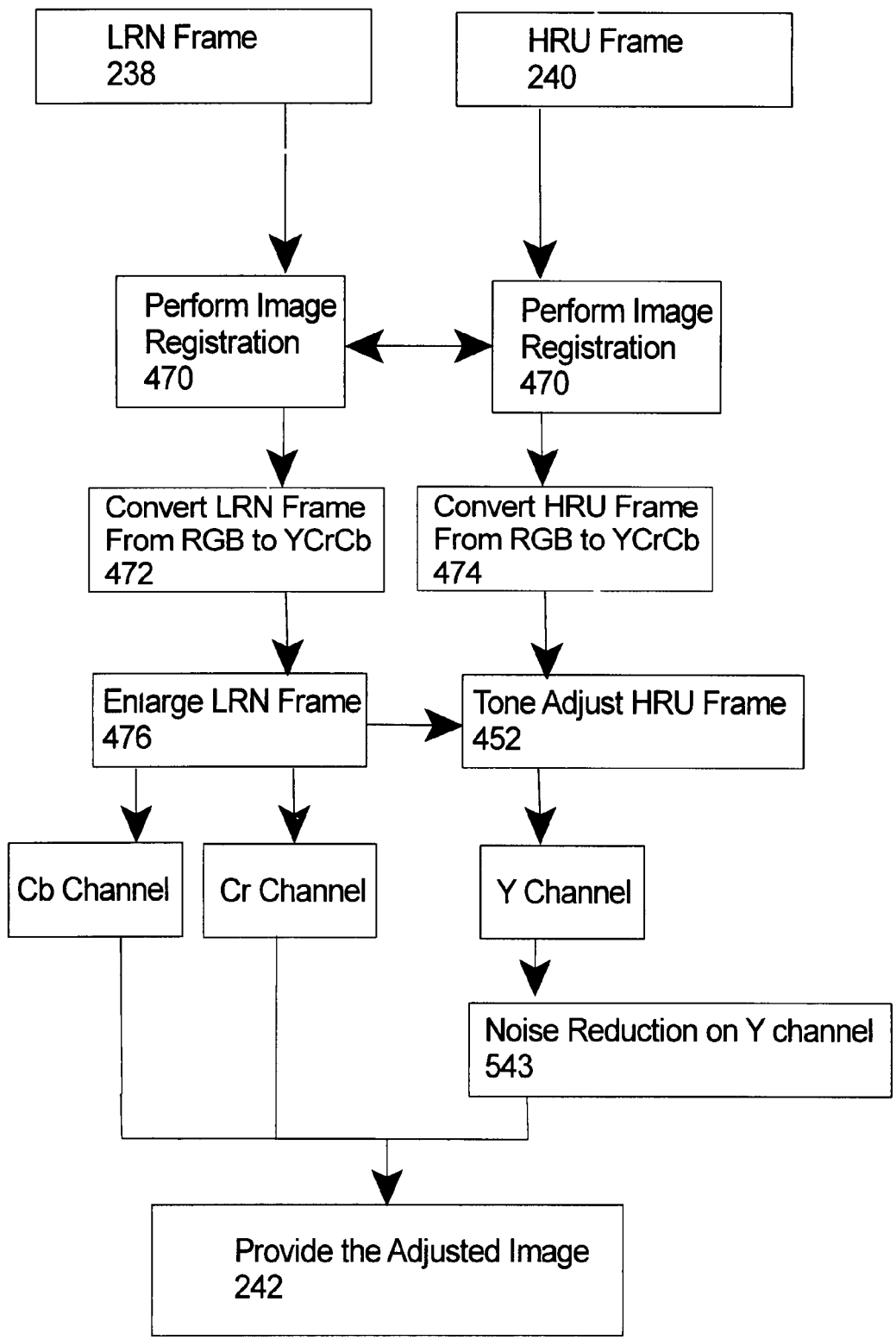
FIG. 5A is a flow chart that illustrates another version of a digital noise reduction approach.

FIG. 5A is a flow chart that illustrates another method to provide the adjusted image 242 that is somewhat similar to the method illustrated in FIG. 4 and described above. In this embodiment, the first step again is to perform image registration to align the LRN frame 238 with the HRU frame 240. In FIG. 5A, after alignment, the LRN frame 238 is converted from RGB color space to the YCbCr color space 472 and the HRU frame 240 is converted from RGB color space to YCbCr color space 474. Next, the LRN frame 538 is enlarged 476 to match the size of the HRU frame 540 and the HRU frame 540 is tone adjusted 452 using the LRN frame 538.

Next, noise reduction 543 can be applied to the luminance "Y" channel of the HRU frame 240. Subsequently, the enlarged chrominance channels 'Cb', 'Cr' of LRN frame 238 are merged with the noise reduced, luminance 'Y' channel of the tone-adjusted HRU frame 240 to provide the adjusted image 242.

It should be noted that one or more of the steps illustrated in FIG. 5A can be optional. For example, tone-adjustment step of the HRU frame 240 can be optional.

Figure 5B:
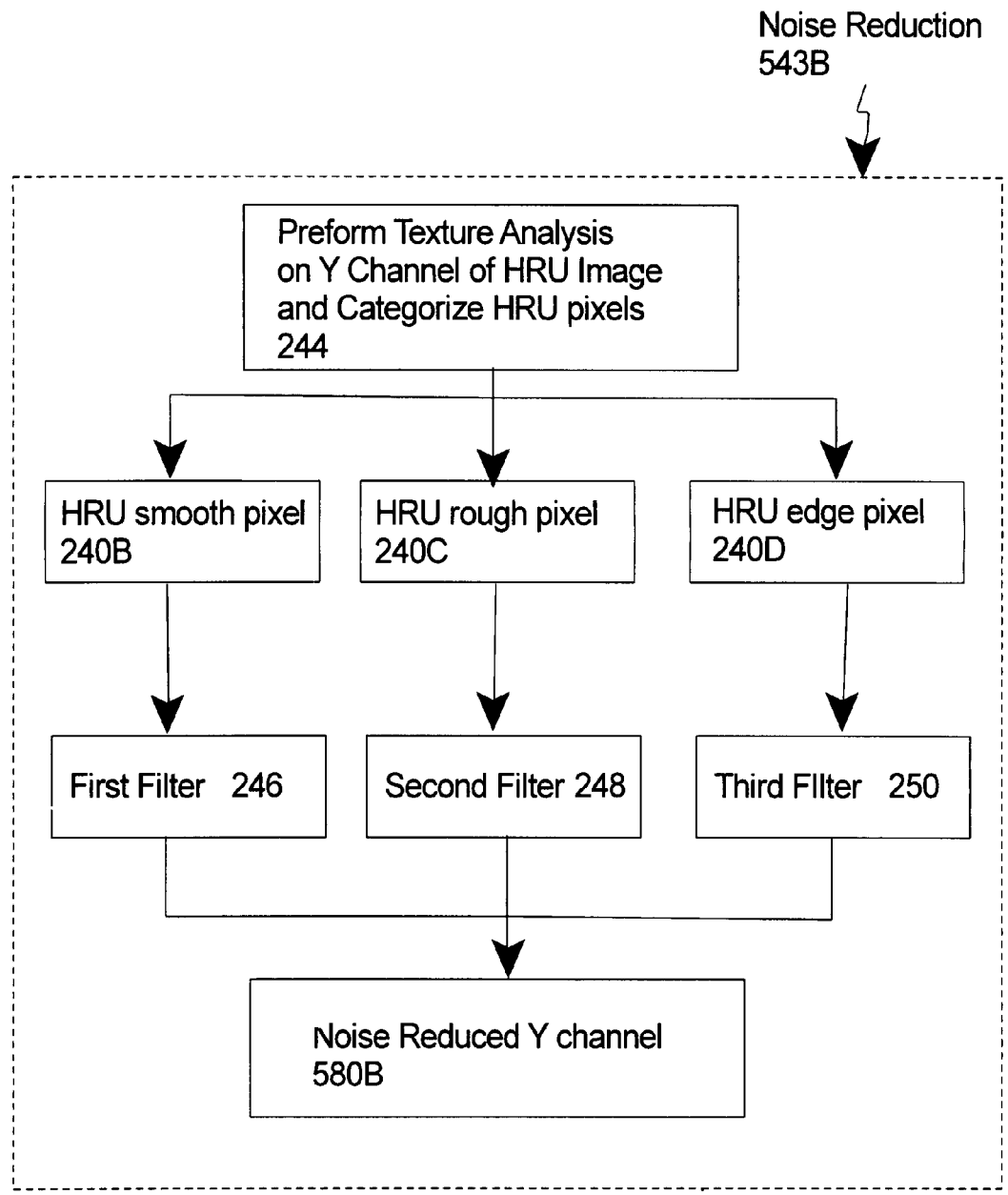
FIG. 5B is a flow chart that illustrates one embodiment of a noise reduction method.

A number of alternative, non-exclusive methods for reducing the noise in the luminance channel of the tone-adjusted HRU image 240 were considered. FIG. 5B is a flow chart that illustrates one method to reduce the noise in the luminance 'Y' channel that is somewhat similar to the noise reduction 243 method described above in reference to FIG. 2B. In this embodiment, the control system 24 performs a texture analysis 244 on the Y channel of the HRU pixels to classify the HRU pixels as HRU smooth pixels 240B, HRU rough pixels 240C, and/or HRU edge pixels 240D. Subsequently, depending upon the classification, different filters can be applied to the information from these HRU pixels 240A to remove noise. In one embodiment, (i) a first filter 246 is applied to the HRU smooth pixels 240B, (ii) a second filter 248 is applied to the HRU rough pixels 240C, and (iii) a third filter 250 is applied to the HRU edge regions 240D. Subsequently, the filtered HRU pixels are merged together to generate the adjusted Y channel of the HRU image.

Figure 5C:
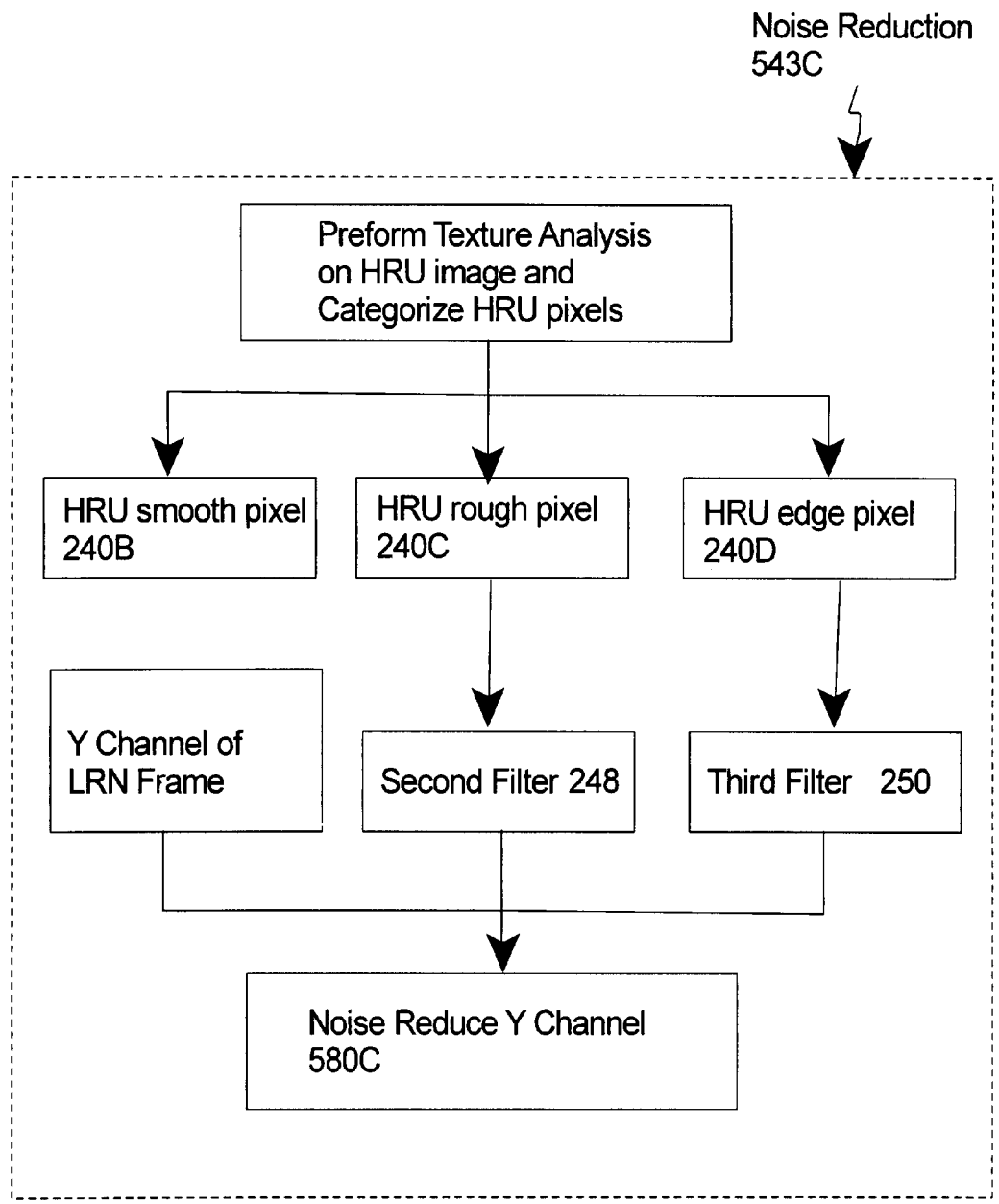
FIG. 5C is a flow chart that illustrates another embodiment of a noise reduction method.

The noise reduction method illustrated in FIG. 5B reduces the noise level, but, in certain embodiments, the performance can be constrained somewhat by the limited information available only from the HRU image 240. In contrast, FIG. 5C illustrates a noise reduction method 543C that uses information from multiple frames. For example, one or more LRN frames 238 can also be used to reduce the noise level of the luminance "Y" channel of the HRU frame 240.

More specifically, in the embodiment illustrated in FIG. 5C, the noise in the luminance 'Y' channel of the HRU frame 240 can be reduced by using the luminance 'Y' of the LRN image 238. In this embodiment, texture analysis 244 is again performed on the luminance 'Y" channel of the HRU frame 240 to classify the pixels as smooth pixels 240B, rough pixels 240C, and edge pixels 240D. Subsequently, the smooth pixels of the HRU image are replaced with the corresponding smooth pixels of the enlarged LRN image. Further, the non-smooth pixels of the HRU frame, e.g. the HRU rough pixels 240C and the HRU edge pixels 240D can be filtered with the second filter 248 and the third filter 250 or otherwise processed to remove noise from these pixels.

Subsequently, referring back to FIG. 5A, the enlarged chrominance channels 'Cb', 'Cr' of LRN frame 238 are merged with the noise reduced, luminance 'Y' channel of the tone-adjusted HRU frame 240 and the LRN frame to provide the adjusted image 242.

Figure 5D:
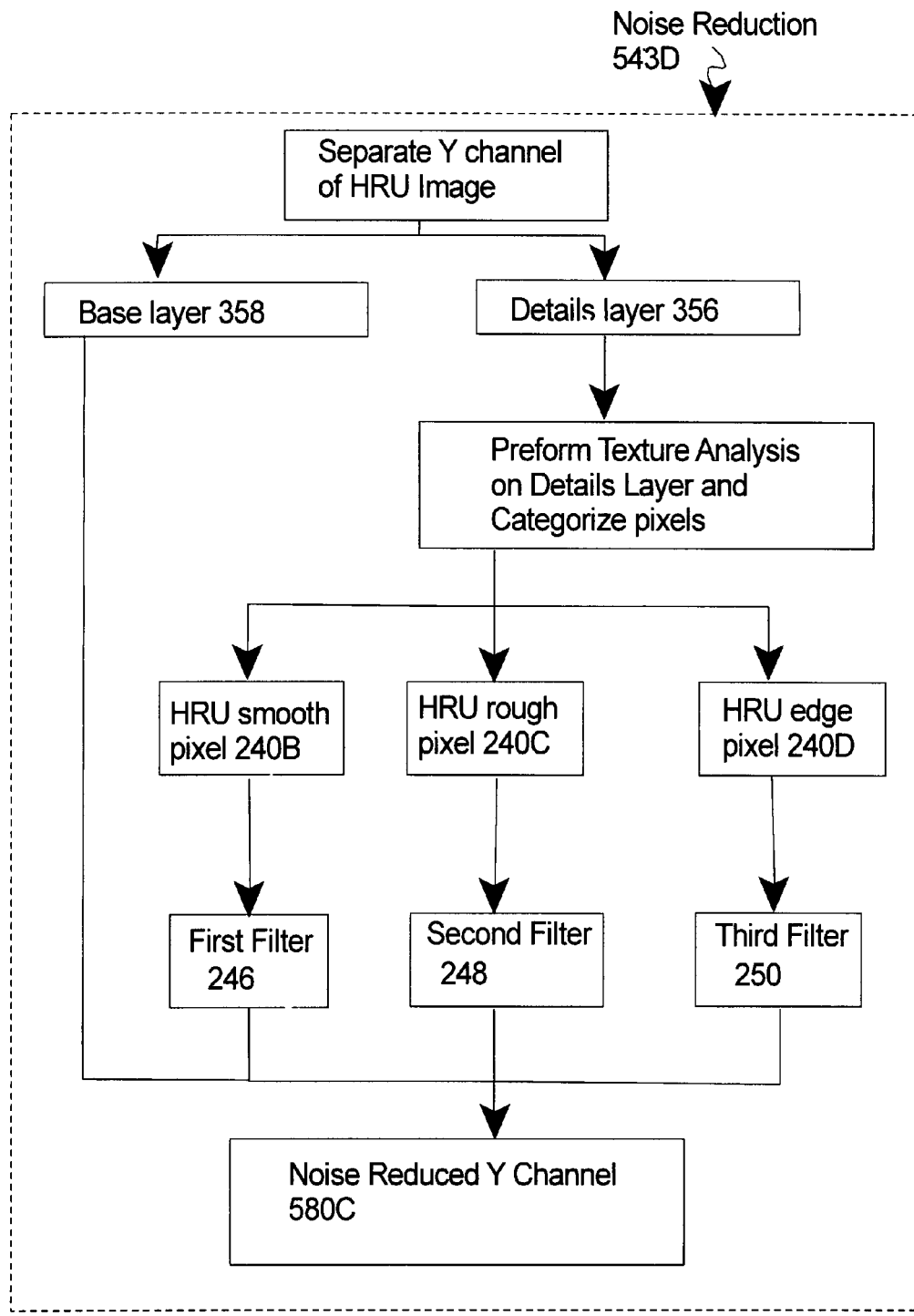
FIG. 5D is a flow chart that illustrates still another noise reduction method.

FIG. 5D is a flow chart that illustrates another embodiment of a noise reduction method 543D. In this embodiment, the noise reduction 543D includes separating the luminance channel of the HRU frame into a details layer 356 and a base layer 358. This can be done using a low pass filter as described above, or by setting the base layer as equal to the luminance channel of the enlarged LRN frame, which is blurry and contains low noise level. Next, the noise reduction 543D is performed on the details layer 356 of the luminance channel of the tone-adjusted HRU frame by classifying the pixels as smooth pixels 240B, rough pixels 240C and edge pixels 240D. Subsequently, the pixels can be processed with one or more filters 246, 248, 250, or otherwise processed to remove noise from these regions.

Next, the base layer 358 is merged with the noise reduced details layer to provide the noise reduced Y channel 580C that can subsequently be combined with the chrominance channels of the LRN frame 238 to form the adjusted image 242.

Figure 6:
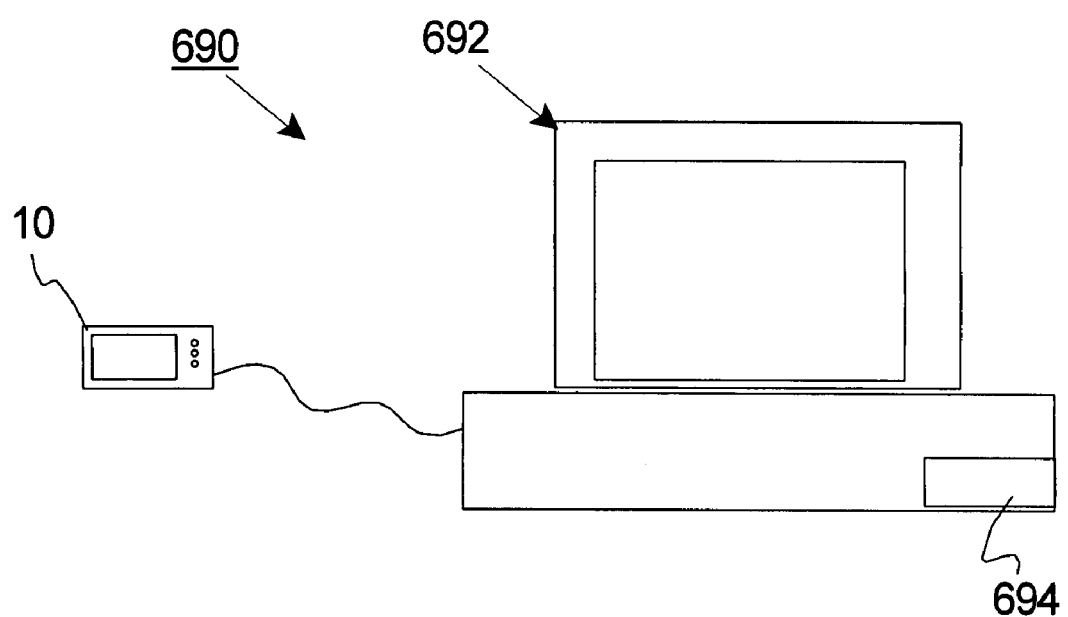
FIG. 6 is a simplified illustration of a system having features of the present invention.

FIG. 6 illustrates another embodiment of a system 690 having features of the present invention. In this embodiment, the system 690 includes a computer 692 that is electrically connected to the image apparatus 10. Further, in this embodiment, one or more of the frames (not shown in FIG. 6) captured by the image apparatus 10 can be transferred from the computer 692. With this design, a control system 694 of the computer 692 can produce the adjusted image (not shown in FIG. 6) with the one or more of the frames using the methods described above. Alternatively, for example, the image apparatus 10 can be connected to the computer 692 in a wireless fashion.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A system for providing an adjusted image of a scene, the system comprising:
 a capturing system that captures a first frame that is defined by a plurality of pixels, the plurality of pixels including a first pixel and a second pixel, the first frame including at least one of a first texture region and a second texture region; and
 a control system that analyzes information from the pixels and categorizes the first pixel as a portion of the first texture region or a portion of the second texture region, wherein if the first pixel is categorized as a portion of the first textured region the information from the first pixel is processed with a first filter, and if the first pixel is categorized as a portion of the second textured region the information from the first pixel is processed with a second filter.

2. The system of claim 1 wherein the control system analyzes information from the pixels and categorizes the second pixel as a portion of the first texture region or the second texture region.

3. The system of claim 2 wherein the first filter is a large low pass filter, and the second filter is a moderate size low pass filter.

4. The system of claim 1 wherein the first filter is a large size low pass filter and the second filter is a moderate size low pass filter.

5. The system of claim 1 wherein the first filter is a large size low pass filter and the second filter is a moderate size low pass filter.

6. The system of claim 1 wherein the control system analyzes the intensity of the first pixel and the intensity of the pixels that are nearby the first pixel to categorize the first pixel as a portion of the first texture region or a portion of the second texture region.

7. The system of claim 1 wherein the first frame is underexposed for the existing lighting conditions.

8. The system of claim 1 wherein the first frame is separated into a base layer and a details layer and the first pixel is from the details layer.

9. The system of claim 1 wherein the first frame includes a luminance channel and wherein the first pixel is from the luminance channel.

10. The system of claim 1 wherein the first frame includes a luminance channel that is separated into a base layer and a details layer and wherein the first pixel is from the details layer of the luminance channel.

11. The system of claim 1 wherein the capturing system captures a second frame of the scene, the second frame having a longer exposure time than the first frame, and wherein the control system separates the first frame into a first base layer and a first details layer and the second frame into a second base layer and a second details layer and wherein the control system combines the first details layer with the second base layer to provide the adjusted image.

12. A system for providing an adjusted image of a scene, the system comprising:
a capturing system that captures a first frame that is defined by a plurality of pixels, the plurality of pixels including a first pixel and a second pixel, the first frame including at least one of a first texture region, a second texture region, and a third texture region; and
a control system that analyzes information from the pixels and categorizes the first pixel as a portion of the first texture region, a portion of the second texture region, or a portion of the third texture region.

13. The system of claim 12 wherein if the first pixel is categorized as a portion of the first textured region the information from the first pixel is processed with a first filter, if the first pixel is categorized as a portion of the second textured region the information from the first pixel is processed with a second filter that is different than the first filter, or if the first pixel is categorized as a portion of the third textured region the information from the first pixel is processed with a third filter that is different from the first filter and the second filter.

14. The system of claim 13 wherein the first filter is a large size low pass filter, the second filter is a moderate size low pass filter, and the third filter is a direction oriented low pass filter.

15. A system for providing an adjusted image of a scene, the system comprising:
a capturing system that captures an under exposed, high resolution, first frame and a properly exposed, low resolution second frame; and
a control system that utilizes information from the second frame to adjust the first frame to provide the adjusted image.

16. The system of claim 15 wherein the control system uses information from the second frame to adjust a tone of the first frame to provide the adjusted image.

17. The system of claim 15 wherein the control system uses information from the second frame to reduce noise in the first frame to provide the adjusted image.

18. The system of claim 15 wherein the control system uses information from the second frame to adjust a tone and reduce noise in the first frame to provide the adjusted image.

19. The system of claim 15 wherein the control system separates the first frame into a first base layer and a first details layer and the second frame into a second base layer and a second details layer and wherein the control system combines the first details layer with the second base layer to provide the adjusted image.

20. An image apparatus for providing an adjusted image of a scene, the image apparatus comprising:
a capturing system that captures a first frame that is defined by a plurality of pixels, the plurality of pixels including a first pixel and a second pixel; and
a control system that processes information from the first pixel with a first filter and processes information from the second pixel with a second filter that is different than the first filter to provide the adjusted image.

21. The image apparatus of claim 20 wherein the first frame includes at least one of a first texture region and a second texture region, and wherein the control system analyzes information from the pixels and determines if the first pixel and the second pixel have captured a portion of the first texture region or the second texture region.

22. The image apparatus of claim 21 wherein the first filter is a large size low pass filter and the second filter is a moderate size low pass filter.

23. The image apparatus of claim 20 wherein the first frame includes at least one of a first texture region, a second texture region, and a third texture region, and the control system analyzes information from the pixels and determines if the first pixel has captured a portion of the first texture region, the second texture region, or the third texture region.

24. The image apparatus of claim 20 wherein the first frame includes a third pixel that is processed with a third filter, and wherein the first filter is a large size low pass filter, the second filter is a moderate size low pass filter, and the third filter is a direction oriented low pass filter.

25. The image apparatus of claim 20 wherein the first frame is underexposed for the existing lighting conditions.

26. The image apparatus of claim 20 wherein the first frame is separated into a base layer and a details layer and the first pixel and the second pixel are from the details layer.

27. The image apparatus of claim 20 wherein the first frame includes a luminance channel and wherein the first pixel and the second pixel are from the luminance channel.

28. The image apparatus of claim 20 wherein the first frame includes a luminance channel that is separated into a base layer and a details layer and wherein the first pixel and the second pixel are from the details layer of the luminance channel.

29. The image apparatus of claim 20 wherein the capturing system captures a second frame of the scene, the second frame having a longer exposure time than the first frame, and wherein the control system separates the first frame into a first base layer and a first details layer, and the second frame into a second base layer and a second details layer and wherein the control system combines the first details layer with the second base layer to provide the adjusted image.

30. An image apparatus for providing a well exposed adjusted image of a scene, the image apparatus comprising:
a capturing system that captures an underexposed first frame that is defined by a plurality of pixels, wherein the first frame includes a plurality of texture regions including at least one of a first texture region and a second texture region, and wherein the plurality of pixels includes a first pixel and a second pixel; and a control system that processes the first frame to provide the well exposed adjusted image, wherein the control system analyzes information from the pixels and determines if the first pixel and the second pixel have captured a portion of one or more of the plurality of texture regions.

31. The image apparatus of claim 30 wherein if the first pixel or the second pixel has captured a portion of the first textured region the information from the first pixel or the second pixel is processed with a first filter, and if the first pixel or the second pixel has captured a portion of the second textured region the information from the first pixel or the second pixel is processed with a second filter that is different than the first filter.

32. The image apparatus of claim 30 wherein the plurality of texture regions includes the first texture region, the second texture region, and a third texture region, and the control system analyzes information from the pixels and determines if the first pixel and the second pixel have captured a portion of the first texture region, the second texture region, or the third texture region.

33. The image apparatus of claim 30 wherein the first frame is separated into a base layer and a details layer, and the details layer is subjected to noise reduction by the control system.

34. The image apparatus of claim 30 wherein the first frame includes a luminance channel, and wherein the luminance channel is subjected to noise reduction by the control system.

35. The image apparatus of claim 30 wherein the first frame includes a luminance channel that is separated into a base layer and a details layer, and wherein the details layer is subjected to noise reduction by the control system.

36. The image apparatus of claim 30 wherein the capturing system captures a second frame of the scene, the second frame having a longer exposure time than the first frame, and wherein the control system separates the first frame into a first base layer and a first details layer, and the second frame into a second base layer and a second details layer and wherein the control system combines the first details layer with the second base layer to provide the adjusted image.

37. A method for providing a well exposed adjusted image of a scene, the method comprising the steps of:

capturing an underexposed first frame that is defined by a plurality of pixels with a capturing system, wherein the first frame includes at least one of a first texture region and a second texture region and the plurality of pixels include a first pixel and a second pixel; and processing the first frame with a control system to provide the well exposed adjusted image, wherein the step of processing includes the steps of analyzing information from the pixels with the control system and determining with the control system if the first pixel and the second pixel have captured a portion of the first texture region or the second texture region.

38. The method of claim 37 wherein the step of processing includes the step of filtering the first pixel with a first filter if the first pixel has captured a portion of the first textured region, the step of filtering the first pixel with a second filter if the first pixel has captured a portion of the second textured region, the step of filtering the second pixel with the first filter if the second pixel has captured a portion of the first textured region, and the step of filtering the second pixel with the second filter if the second pixel has captured a portion of the second textured region.

39. The method of claim 37 wherein the step of processing includes the step of separating the first frame into a base layer and a details layer, and the step of reducing the noise in the details layer with the control system.

40. The method of claim 37 wherein the step of processing includes the step of separating a luminance channel from the first frame, and the step of reducing the noise in the luminance channel with the control system.

41. The method of claim 37 wherein the step of processing includes the step of separating a luminance channel from the first frame into a base layer and a details layer, and the step of reducing the noise in the details layer of the luminance channel with the control system.

42. The method of claim 37 further comprising the step of capturing a second frame of the scene with the capturing system, the second frame having a longer exposure time than the first frame, and wherein the step of processing includes the steps of separating the first frame into a first base layer and a first details layer, separating the second frame into a second base layer and a second details layer, and combining the first details layer with the second base layer to generate the adjusted image.

* * * * *